(12) United States Patent
Boudreau et al.

(10) Patent No.: US 9,274,778 B2
(45) Date of Patent: *Mar. 1, 2016

(54) SOFTWARE SIGNATURE DISCOVERY

(71) Applicant: International Business Machines Corporation, Armonk, NY (US)

(72) Inventors: Michael K. Boudreau, Orange, CA (US); Jamie B. Marsnik, Annandale, MN (US); Bradley T. Moore, Dana Point, CA (US); Angela T. Pistole, Pittsboro, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,470

(22) Filed: Sep. 16, 2015

(65) Prior Publication Data

US 2016/0004523 A1 Jan. 7, 2016

Related U.S. Application Data (63) Continuation of application No. 14/597,591, filed on Jan. 15, 2015, now Pat. No. 9,182,968, which is a continuation of application No. 13/852,605, filed on Mar. 28, 2013, now Pat. No. 8,966,471.

(51) Int. Cl.
*G06F 9/445* (2006.01)

(52) U.S. Cl.
CPC ... *G06F 8/61* (2013.01); *G06F 8/62* (2013.01)

(58) Field of Classification Search
CPC .......................................................... G06F 8/61
See application file for complete search history.

(56) References Cited

U.S. PATENT DOCUMENTS

| | | | | |
|---|---|---|---|---|
| 6,049,663 A | * | 4/2000 | Harikrishnan | G06F 8/62 703/23 |
| 6,675,382 B1 | * | 1/2004 | Foster | G06F 8/61 707/999.1 |
| 6,981,252 B1 | * | 12/2005 | Sadowsky | G06F 8/62 717/176 |
| 8,966,471 B2 | | 2/2015 | Boudreau et al. | |
| 2003/0018964 A1 | * | 1/2003 | Fox | G06F 8/61 717/177 |
| 2006/0069801 A1 | | 3/2006 | Rich et al. | |
| 2010/0077479 A1 | * | 3/2010 | Viljoen | G06F 21/577 726/23 |
| 2010/0275029 A1 | | 10/2010 | Little et al. | |
| 2011/0093701 A1 | | 4/2011 | Etchegoyen | |
| 2012/0137138 A1 | | 5/2012 | Gregorovic et al. | |
| 2012/0246721 A1 | * | 9/2012 | Viljoen | G06F 21/577 726/22 |
| 2014/0298315 A1 | | 10/2014 | Boudreau et al. | |
| 2015/0143359 A1 | | 5/2015 | Boudreau et al. | |

* cited by examiner

*Primary Examiner* — Philip Wang
(74) *Attorney, Agent, or Firm* — Nicholas L. Cadmus (57) ABSTRACT

In a method for determining and scoring a signature for a software package. A processor determines a signature of a first software package, wherein the signature comprises an indication of a first set of files on a computer system after installation of the first software package that were not present on the computer system before the installation, and an indication of a second set of files not remaining on the computer system after an uninstall of the first software package. A processor compares the first and the second set of files indicated in the signature of the first software package to files indicated in one or more other signatures of other software packages. A processor determines a score for the signature of the first software package based on the comparison.

12 Claims, 4 Drawing Sheets

350

| PROGRAM | SIGNATURES | | | | | | | |
|---|---|---|---|---|---|---|---|---|
| PROGRAM ALPHA | D | E | F* | G* | | | | |
| PROGRAM GAMMA | D* | | F | | H* | I | J* | |
| PROGRAM ZETA | D | | | | H* | I | | K* |
| SCORE | 0.123 | 0.500 | 0.350 | 1.000 | 0.700 | 0.175 | 1.000 | 1.000 |

* CRITICAL ARTIFACT

FIG. 2

| CLEAN SYSTEM FILES | POST-INSTALL FILES | POST-UNINSTALL FILES | SIGNATURE | CRITICAL ARTIFACTS |
|---|---|---|---|---|
| A | A | A | | |
| B | B | B | | |
| C | C | C | | |
| | D | D | D | |
| | E | E | E | |
| | F | | F | F |
| | G | | G | G |

SYSTEM SNAPSHOTS AND SIGNATURE FOR "PROGRAM ALPHA" ~300

FIG. 3a

| PROGRAM | SIGNATURES | | | | | | | | SCORE |
|---|---|---|---|---|---|---|---|---|---|
| | D | E | F* | G* | H* | — | J* | K* | |
| PROGRAM ALPHA | D* | | F | | H* | | | | 0.123 |
| PROGRAM GAMMA | D | | | | H* | — | | | |
| PROGRAM ZETA | | | | | | | J* | K* | |
| SCORE | | 0.500 | 0.350 | 1.000 | 0.700 | 0.175 | 1.000 | 1.000 | |

* CRITICAL ARTIFACT

FIG. 4

SOFTWARE SIGNATURE DISCOVERY

FIELD OF THE INVENTION

The present invention relates generally to the field of computer software and more particularly to a method for generating and scoring a signature for a software package.

BACKGROUND OF THE INVENTION

Computer software is fundamentally a set of instructions written to carry out a desired task. Computer software can be stored and distributed in many forms, including but not limited to local storage such as hard disk drives and optical media (e.g. compact discs), networked storage devices, and even non-digital media (e.g. punch cards). The highly portable nature of computer software, and other digital content, facilitates duplication and distribution. Computer software can be made up of many individual software components, such as files or executable programs, which are typically encapsulated in an executable installation package for ease of distribution. The installation package will typically include an executable program to remove, or uninstall, the computer software. Computer software is also frequently modified and updated.

Software deployment is the process of making computer software available for use on a computer system. Conventional software deployment involves copying an installation package to the local storage of a computer system and executing the installation package to place the individual software components on the system. In a network environment, where computer software must be deployed to multiple computer systems, this process is typically automated. Furthermore, in network environments, the installation package is typically executed remotely on a networked storage device and only the individual software components from within the installation package are copied to the multiple computer systems.

The use and distribution of commercially available computer software is typically controlled by software licenses. Depending on the level of software license purchased, the computer software may be fully activated or some features may be limited. Different software license options are typically available for the level of features desired and the number of computer systems that may use the software package under a single software license.

Software asset management typically refers to the tracking and management of computer software installed on a computer system for the purposes of keeping the computer software up to date, identifying conflicts, managing software licenses, and tracking software usage. Software asset management solutions are typically employed in large organizations where numerous packages of computer software are deployed to a multitude of computer systems in a networked environment.

SUMMARY

Aspects of the present invention disclose a method, system, and computer program product for determining and scoring a signature for a software package. At least one processor determines a signature of a first software package, wherein the signature comprises an indication of a first set of files on a computer system after installation of the first software package that were not present on the computer system before the installation, and an indication of a second set of files not remaining on the computer system after an uninstall of the first software package. At least one processor compares the first set of files and the second set of files indicated in the signature of the first software package to files indicated in one or more other signatures of other software packages. At least one processor determines a score for the signature of the first software package based on the comparison of the first set of files and the second set of files indicated in the signature of the first software package to the files indicated in the one or more other signatures of the other software packages.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
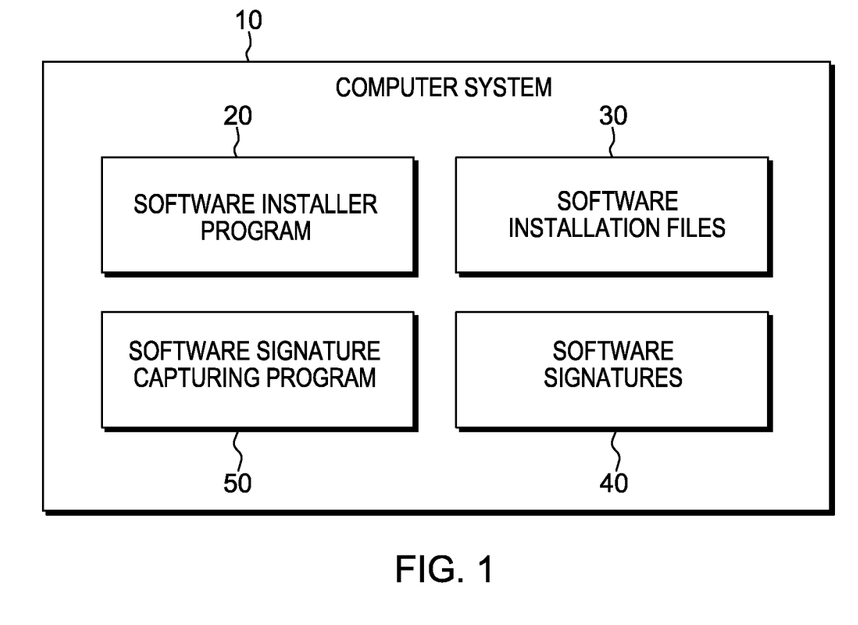
FIG. 1 is a functional block diagram illustrating a computer system, in accordance with an embodiment of the present invention.

The present invention will now be described in detail with reference to the Figures. FIG. 1 is a functional block diagram illustrating a computer system, in accordance with an embodiment of the present invention. FIG. 1 provides only an illustration of one embodiment and does not imply any limitations with regard to the environments in which different embodiments may be implemented.

In the depicted embodiment, computer system 10 may be a desktop computer, laptop computer, tablet computer, personal digital assistant (PDA), or smart phone. In other embodiments, computer system 10 may represent any electronic device or computer system capable of sending and receiving data and executing program instructions. Computer system 10 includes a software installer program 20, software installation files 30, software signatures 40, and software signature capturing program 50.

Software installer program 20 operates to install, uninstall, and manage software on computer system 10. In one embodiment, software installer program 20 resides on computer system 10. In other embodiments, software installer program 20 may reside on another computer system or computing device, provided that software installer program 20 has access to software installation files 30 and that software installer program 20 can communicate with computer system 10. For example, software installer program 20 may reside on a computing device connected to computer system 10 over a network (such as a local area network, wide area network, the Internet, or any combination thereof).

Software installation files 30 are files that may be read by software installer program 20. In one embodiment, software installation files 30 may be in the form of standalone files, an archive of files, an executable file, or any combination thereof. In one embodiment, software installation files 30 resides on computer system 10. In other embodiments, software installation files 30 may reside on another computer system or computing device, provided that software installation files 30 is accessible to software installer program 20. For example, software installation files 30 may reside on a computing device connected to computer system 10 over a network (such as a local area network, wide area network, the Internet, or any combination thereof).

Software signatures 40 may be a file written to and read by software signature capturing program 50. In another embodiment, software signatures 40 may be a database such as Oracle® or an IBM® BD2® database. In one embodiment, software signatures 40 resides on computer system 10. In other embodiments, software signatures 40 may reside on another computer system or computing device, provided that software signatures 40 is accessible to software signature capturing program 50. For example, software signatures 40 may reside on a computing device connected to computer system 10 over a network (such as a local area network, wide area network, the Internet, the public switched telephone network, or any combination thereof).

In one embodiment, software signatures 40 includes one or more software signatures determined by software signature capturing program 50. A software signature is associated with a software package installed on computer system 10. A software signature may be a listing of any file added to or modified on computer system 10 after a software package is installed to the clean system (i.e. computer system 10 includes only software signature capturing program 50, apart from the software required to run the system, such as an operating system).

Software signatures 40 may also include snapshots of computer system 10. The snapshot of a computer system may include the names and locations of all files residing on that computer system at the time of the snapshot. The snapshot may store additional information associated with each file in the snapshot including, but not limited to, file size, creation date, and date last modified. Software signatures 40 may include multiple snapshots per computer system, each snapshot corresponding with a different state (i.e. amount of software installed on the computer system at any given time) of the computer system. Software signatures 40 may also include a score associated with each software signature stored by software signature capturing program 50.

Software signature capturing program 50 operates to determine and score a software signature for a software package installed on computer system 10. Software signature capturing program 50 also operates to store snapshots of computer system 10. The snapshot of a computer system may include the names and locations of all files residing on that computer system at the time of the snapshot.

In one embodiment, software signature capturing program 50 resides on computer system 10. In another embodiment, software signature capturing program 50 may be a function of software installer program 20. In other embodiments, software signature capturing program 50 may reside on another computer system or computing device, provided that software signature capturing program 50 has access to computer system 10 and software signatures 40, and provided that software signature capturing program 50 can communicate with software installer program 20. For example, software signature capturing program 50 may reside on a computing device connected to computer system 10 over a network (such as a local area network, wide area network, the Internet, or any combination thereof).

Figure 2:
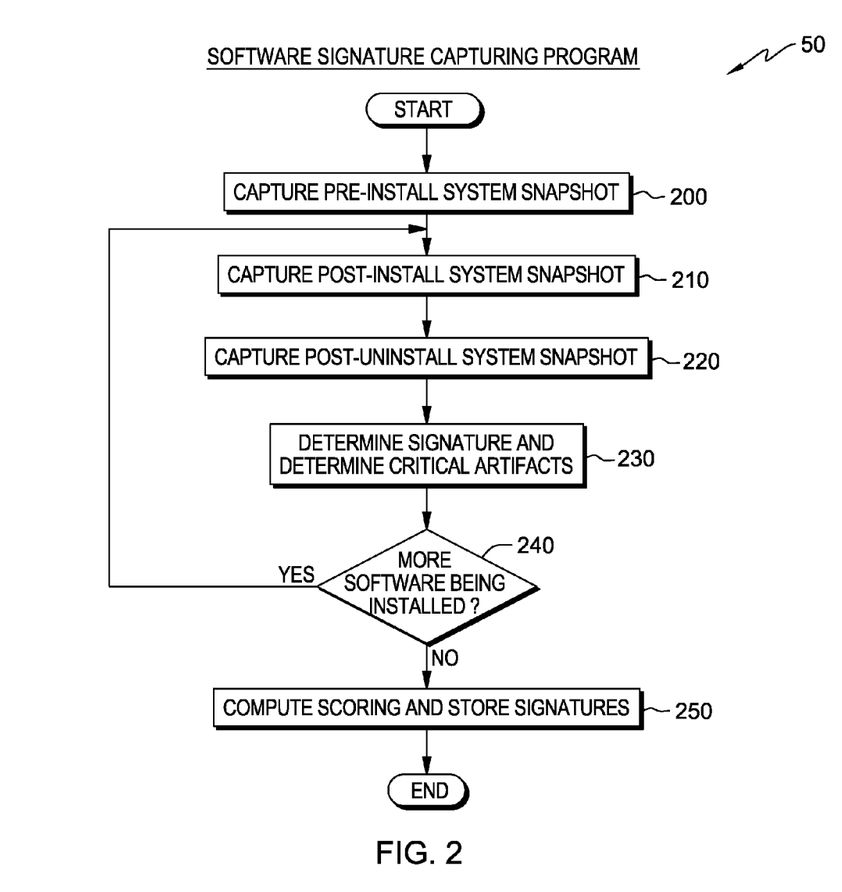
FIG. 2 depicts a flowchart of a software signature capturing program for determining and scoring a software signature for a software package, in accordance with one embodiment of the present invention.

FIG. 2 depicts a flowchart of software signature capturing program 50 for determining and scoring a software signature for a software package in accordance with one embodiment of the present invention. Initially, multiple software packages (i.e. multiple programs to be installed) are selected for which software signatures and corresponding scores are to be generated. The installation files for these software packages are in software installation files 30. In one embodiment, software signature capturing program 50 is started by the user.

In step 200, software signature capturing program 50 captures a snapshot of computer system 10. Computer system 10 initially includes only software signature capturing program 50 apart from software required to run the system, such as an operating system (i.e. computer system 10 is a 'clean' system). To create snapshots, software signature capturing program 50 traverses the entire local storage of computer system 10 and creates a listing of the names and locations of all files residing computer system 10 at the time of the snapshot. The snapshot may store additional information associated with each file in the snapshot including, but not limited to, file size, creation date, and date last modified. Software signature capturing program 50 stores this snapshot in software signatures 40 as the pre-install system snapshot (i.e. the clean system snapshot).

Software installer program 20 is executed to install a software package from software installation files 30 to computer system 10. In one embodiment, the execution of software installer program 20 may be initiated by another program. For example, a program running on a computing device connected to computer system 10 over a network may send an indication to software installer program 20, residing on computer system 10, to begin installing the software package. In another embodiment, execution of software installer program 20 may be initiated by a user. For example, a user may initiate software installer program 20 to install the software package on computer system 10. Software installer program 20 copies the files pertaining to the software package being installed (i.e. the 'current software package') from software installation files 30 to the local storage of computer system 10. The locations to which the files are copied may be user-defined or prescribed by a configuration file included in the installation files of the current software package.

In one embodiment, software installer program 20 sends an indication to software signature capturing program 50 in response to a completed software package installation. In another embodiment, software signature capturing program 50 may monitor the progress of software installer program 20 during the installation of the software package. In another embodiment, software signature capturing program 50 may be a function of software installer program 20. In another embodiment, software signature capturing program 50 may be started by a user in response to the software package being installed on computer system 10.

In step 210, in response to the completed installation of the current software package, software signature capturing program 50 captures a snapshot of computer system 10, which includes the files from the clean system snapshot in addition to the files from the current software package. Software signature capturing program 50 stores this snapshot in software signatures 40 as the post-install system snapshot associated with the current software package.

Software installer program 20 is executed to uninstall (i.e. remove) the current software package from computer system 10. In one embodiment, the execution of software installer program 20 may be initiated by another program. For example, a program running on a computing device connected to computer system 10 over a network may send an indication to software installer program 20, residing on computer system 10, to begin uninstalling the software package. In another embodiment, the execution of software installer program 20 may be initiated by a user. For example, a user may initiate software installer program 20 to uninstall the software package from computer system 10. Software installer program 20 removes the files pertaining to the software package from computer system 10. The locations from which the files are removed may be user-defined or prescribed by a configuration file included in the installation files of the current software package.

In one embodiment, software installer program 20 sends an indication to software signature capturing program 50 in response to the completion of the software package removal. In another embodiment, software signature capturing program 50 may monitor the progress of software installer program 20 during the removal of the current software package. In another embodiment, software signature capturing program 50 may be a function of software installer program 20. In another embodiment, software signature capturing program 50 may be started by a user in response to the current software package being uninstalled from computer system 10.

In step 220, in response to the removal of the current software package, software signature capturing program 50 captures a snapshot of computer system 10, which includes the files from the clean system snapshot in addition to the files left over from the removal of the current software package. Software signature capturing program 50 stores this snapshot in software signatures 40 as the post-uninstall system snapshot associated with the current software package.

In step 230, software signature capturing program 50 determines the software signature for current software package. In one embodiment, the software signatures for the current software package are obtained by comparing the pre-install system snapshot (i.e. clean system snapshot) with the post-install system snapshot associated with the current software package. In one embodiment, any file found in the post-install system snapshot that is not also found in the pre-install system snapshot may be marked as part of the software signature associated with the current software package. In one embodiment, the comparison of system snapshots may occur based only on the filenames in each snapshot. In another embodiment, the comparison may take into account changes in other information associated with each file in the snapshot including, but not limited to, file size, creation date, and date last modified.

In step 230, software signature capturing program 50 further determines whether or not a file found in the post-install system snapshot that is not also found in the pre-install system snapshot is a critical artifact of the software package. A critical artifact is a file that was removed when the software package was uninstalled (i.e. a critical artifact is a file that is not left behind after the software is uninstalled). In one embodiment, the critical artifacts for the current software package that was uninstalled are obtained by comparing the post-install system snapshot with the post-uninstall system snapshot associated with the current software package. In one embodiment, any file found in the post-install system snapshot that is not also found in the post-uninstall system snapshot may be marked as a critical artifact of the current software package. In one embodiment, the comparison of system snapshots may occur based only on the filenames in each snapshot. In another embodiment, the comparison may take into account changes in other information associated with each file in the snapshot including, but not limited to, file size, creation date, and date last modified.

Any files discovered in step 230 that are not also critical artifacts of the uninstalled program are marked as non-critical artifacts (i.e. files that are left behind after the software has been uninstalled) of the current software package.

In decision 240, software signature capturing program 50 determines if there is another software package for which a signature and score must be generated. In one embodiment, the installation of software packages on computer system 10 is automatically controlled by another program which sends an indication to software signature capturing program 50 to either wait for another software package to be installed, or to continue running. In another embodiment, a user will indicate whether another software package is to be installed.

If software signature capturing program 50 determines that there is another software package to be installed on computer system 10 (decision 240, Yes branch), software capturing program 60 returns to step 210 to capture the post-install system snapshot associated with the next software package being installed.

If software signature capturing program 50 determines that there is another software package to be installed on computer system 10 (decision 240, No branch), software capturing program 60 continues to step 250.

In step 250, software signature capturing program 50 determines a score for each software signature determined. The score assigned to each software signature is a measure of how accurately the presence of that software signature can point to the presence of the software package it came from.

In one embodiment, the score assigned to each software signature depends on how many times the same file appears in software signatures 40 (across multiple software packages) as well as in how many of those appearances is the file a critical artifact. For example, a single file may be a critical artifact for two separate software packages, and also be a non-critical artifact for a third software package. The score for every file begins at unity. For every duplicate appearance of a file in software signatures 40, the score for that file would be multiplied by a less-than-unity weight (e.g. 0.7), and if that appearance is also as a non-critical artifact, the score would be further multiplied by a less-than-unity weight (e.g. 0.5). In other embodiments, the scoring and weighting system may differ.

Software signature capturing program 60 stores the computed software signatures and their respective scores in software signatures 40.

Figure 3A:
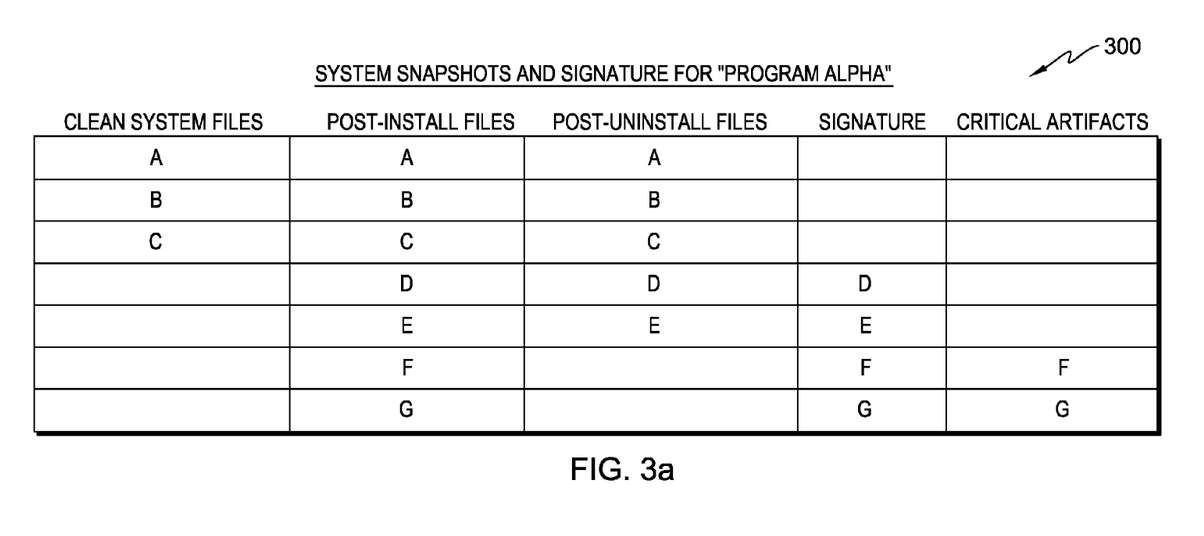
FIG. 3A depicts a use-case scenario of capturing system snapshots and determining and scoring a software signature for a software package, in accordance with one embodiment of the present invention.
Figure 3B:
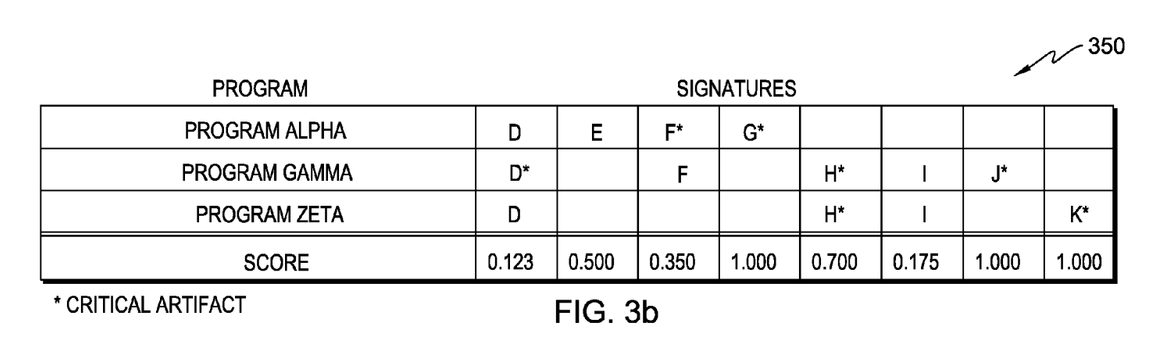
FIG. 3B depicts a use-case scenario of assigning scores to software signatures in accordance with one embodiment of the present invention.

The following descriptions of FIG. 3A and FIG. 3B illustrate the determination of a software signature from system snapshots, as well as assigning scores to software signature.

FIG. 3a depicts a use-case scenario of capturing system snapshots and determining and scoring a software signature in accordance with one embodiment of the present invention. Table 300 shows the different stages of system snapshots before and after installing 'Program Alpha' on a clean system and the subsequent software signature obtained from the system snapshots. In one embodiment, the contents of table 300 would be stored in software signatures 40. Before Program Alpha was installed, software signature capturing program 50 obtained the system snapshot for the clean system ('Clean System Files' column in table 300), and files A, B, and C make up the clean system snapshot. After installing Program Alpha, the post-install system snapshot (Post-Install Files' column in table 300) shows files A, B, C, D, E, F, and G. From these two snapshots it is possible to obtain the software signature for Program Alpha ('Signature' column in table 300) by selecting all of the files that are in the 'Post-Install Files' but are not in 'Clean System Files' (i.e. the relative complement of 'Clean System Files' with respect to 'Post Install Files'). This gives files D, E, F, and G as a software signature for Program Alpha.

Similarly, it is possible to identify the critical artifacts ('Critical Artifacts' column in table 300) by selecting all of the files that are in the 'Signature' column but are not in 'Post-Uninstall Files' column (i.e. the relative complement of 'Post-Uninstall Files' with respect to 'Signatures'). This gives files F and G as critical artifacts, and all files for Program Alpha (D and E) are defined to be non-critical artifacts.

FIG. 3b depicts a use-case scenario of assigning scores to software signatures in accordance with one embodiment of the present invention. Table 350 depicts the signatures for three installed software packages: Program Alpha, Program Gamma, and Program Zeta. The process for identification of the software signature and critical artifacts of Program Alpha is explained in FIG. 3a, and similar methods are used to obtain signatures for exemplary Programs Gamma and Zeta. Once the software signatures for each software package have been identified, the software signatures are assigned a score.

In one embodiment, scores start at unity, with files multiplied by a weight of 0.7 for each duplicate appearance, and also multiplied by 0.5 for each occurrence that is a non-critical artifact. For example, file D appears as a non-critical artifact in Program Alpha (multiply by 0.5 for non-critical artifact), again as a critical artifact in Program Gamma (multiply by 0.7 for a repeated file), and again as a non-critical artifact in Program Zeta (multiply by 0.5 for non-critical artifact, multiply by 0.7 for a repeated file). The total score for file D is 1*0.5*0.7*0.5*0.7=0.123. Scores for software signatures E through G are similarly computed. The highest score is unity, and is only achieved when the file is a critical artifact and is not repeated in the signature of other software packages.

Figure 4:
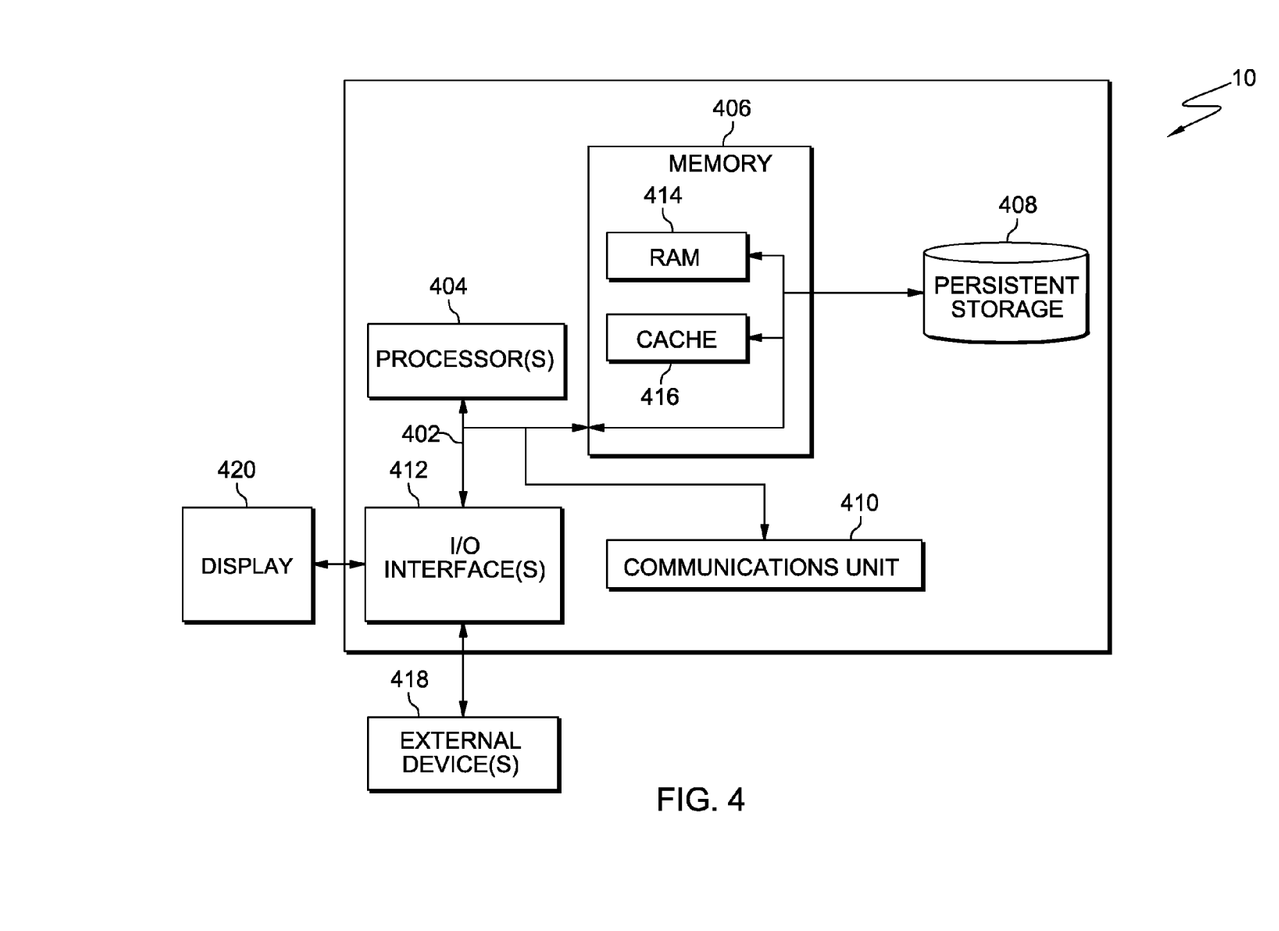
FIG. 4 depicts a block diagram of components of the computer system of FIG. 1, in accordance with an embodiment of the present invention.

FIG. 4 depicts a block diagram of components of computer system 10 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 10 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Software installer program 20, software installation files 30, software signatures 40, and software signature capturing program 50 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of enterprise grid 112 and client devices 104, 106, and 108. In these examples, communications unit 410 includes one or more network interface cards. Communications unit 410 may provide communications through the use of either or both physical and wireless communications links. Software installer program 20, software installation files 30, software signatures 40, and software signature capturing program 50 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., software installer program 20, software installation files 30, software signatures 40, and software signature capturing program 50, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining and scoring a signature for a software package, the method comprising the steps of:
   at least one processor determining a signature of a first software package, wherein the signature comprises an indication of a first set of files on a computer system after installation of the first software package that were not present on the computer system before the installation, and an indication of a second set of files not remaining on the computer system after an uninstall of the first software package;
   at least one processor comparing the first set of files and the second set of files indicated in the signature of the first software package to files indicated in one or more other signatures of other software packages; and
   at least one processor determining a score for the signature of the first software package based on the comparison of the first set of files and the second set of files indicated in the signature of the first software package to the files indicated in the one or more other signatures of the other software packages, wherein the score for the signature of the first software package is a measure of how accurately the presence of the signature on any computer system can indicate the presence of the first software package on that computer system.

2. The method of claim 1, wherein the step of at least one processor determining a signature of a first software package comprises:
   at least one processor comparing files on the computer system after the installation of the first software package to files on the computer system before the installation; and
   at least one processor comparing files remaining on the computer system after an uninstall of the first software package to the files on the computer system after the installation of the first software package.

3. The method of claim 1, wherein the step of at least one processor determining the score for the signature of the first software package comprises the step of:
   multiplying by a first value each file of the first set of files indicated in the signature unless that file is also in the second set of files indicated in the signature, wherein each file in the first set of files and the second set of files indicated in the signature of the first software package has a starting score of unity, and wherein the first value is a first percentage.

4. The method of claim 3, wherein the step of at least one processor determining the score for the signature of the first software package further comprises the step of:
multiplying each file of the first set of files and the second set of files indicated in the signature of the first software package that are indicated in the one or more other signatures of the other software packages by a second value, wherein the second value is a second percentage that is larger than the first percentage.

5. A computer program product for determining and scoring a signature for a software package, the computer program product comprising:
one or more computer-readable storage devices and program instruction stored on at least one of the one or more storage devices, the program instructions comprising:
program instructions to determine a signature of a first software package, wherein the signature comprises an indication of a first set of files on a computer system after installation of the first software package that were not present on the computer system before the installation, and an indication of a second set of files not remaining on the computer system after an uninstall of the first software package;
program instructions to compare the first set of files and the second set of files indicated in the signature of the first software package to files indicated in one or more other signatures of other software packages; and
program instructions to determine a score for the signature of the first software package based on the comparison of the first set of files and the second set of files indicated in the signature of the first software package to the files indicated in the one or more other signatures of the other software packages, wherein the score for the signature of the first software package is a measure of how accurately the presence of the signature on any computer system can indicate the presence of the first software package on that computer system.

6. The computer program product of claim 5, wherein the program instructions to determine a signature of a first software package comprises program instructions to:
compare files on the computer system after the installation of the first software package to files on the computer system before the installation; and
compare files remaining on the computer system after an uninstall of the first software package to the files on the computer system after the installation of the first software package.

7. The computer program product of claim 5, wherein the program instructions to determine the score for the signature of the first software package comprises program instructions to:
multiply by a first value each file of the first set of files indicated in the signature unless that file is also in the second set of files indicated in the signature, wherein each file in the first set of files and the second set of files indicated in the signature of the first software package has a starting score of unity, and wherein the first value is a first percentage.

8. The computer program product of claim 7, wherein the program instructions to determine the score for the signature of the first software package further comprises program instructions to:
multiply each file of the first set of files and the second set of files indicated in the signature of the first software package that are indicated in the one or more other signatures of the other software packages by a second value, wherein the second value is a second percentage that is larger than the first percentage.

9. A computer system for determining and scoring a signature for a software package, the computer program product comprising:
one or more processors, one or more computer-readable memories, one or more computer-readable storage devices and program instructions which are stored on at least one of the one or more storage devices for execution by at least one of the one or more processors via at least one of the one or more memories, the program instructions comprising:
program instructions to determine a signature of a first software package, wherein the signature comprises an indication of a first set of files on a computer system after installation of the first software package that were not present on the computer system before the installation, and an indication of a second set of files not remaining on the computer system after an uninstall of the first software package;
program instructions to compare the first set of files and the second set of files indicated in the signature of the first software package to files indicated in one or more other signatures of other software packages; and
program instructions to determine a score for the signature of the first software package based on the comparison of the first set of files and the second set of files indicated in the signature of the first software package to the files indicated in the one or more other signatures of the other software packages, wherein the score for the signature of the first software package is a measure of how accurately the presence of the signature on any computer system can indicate the presence of the first software package on that computer system.

10. The computer system of claim 9, wherein the program instructions to determine a signature of a first software package comprises program instructions to:
compare files on the computer system after the installation of the first software package to files on the computer system before the installation; and
compare files remaining on the computer system after an uninstall of the first software package to the files on the computer system after the installation of the first software package.

11. The computer system of claim 9, wherein the program instructions to determine the score for the signature of the first software package comprises program instructions to:
multiply by a first value each file of the first set of files indicated in the signature unless that file is also in the second set of files indicated in the signature, wherein each file in the first set of files and the second set of files indicated in the signature of the first software package has a starting score of unity, and wherein the first value is a first percentage.

12. The computer system of claim 11, wherein the program instructions to determine the score for the signature of the first software package further comprises program instructions to:
multiply each file of the first set of files and the second set of files indicated in the signature of the first software package that are indicated in the one or more other signatures of the other software packages by a second value, wherein the second value is a second percentage that is larger than the first percentage.

* * * * *